US011927310B2

(12) United States Patent
Yeh

(10) Patent No.: US 11,927,310 B2
(45) Date of Patent: Mar. 12, 2024

(54) EMERGENCY RESPONSE CONTAINMENT VESSEL FOR CYLINDER

(71) Applicant: LINDE LIENHWA INDUSTRIAL GASES CO., LTD., Taipei (TW)

(72) Inventor: Ming-Hui Yeh, Taipei (TW)

(73) Assignee: LINDE LIENHWA INDUSTRIAL GASES CO., LTD., Taipei (TW)

( * ) Notice: Subject to any disclaimer, the term of this patent is extended or adjusted under 35 U.S.C. 154(b) by 356 days.

(21) Appl. No.: 17/452,939

(22) Filed: Oct. 29, 2021

(65) Prior Publication Data

US 2022/0136657 A1 May 5, 2022

(30) Foreign Application Priority Data

Oct. 30, 2020 (TW) ................................ 109137950

(51) Int. Cl.
*F17C 13/06* (2006.01)
*F17C 13/08* (2006.01)
*F17C 13/12* (2006.01)

(52) U.S. Cl.
CPC ............ *F17C 13/06* (2013.01); *F17C 13/085* (2013.01); *F17C 13/12* (2013.01); *F17C 2201/0104* (2013.01); *F17C 2260/037* (2013.01); *F17C 2270/0165* (2013.01)

(58) Field of Classification Search
CPC ........ F17C 13/06; F17C 13/085; F17C 13/12; F17C 2201/0104; F17C 2260/037; F17C 2270/0165
See application file for complete search history.

(56) References Cited

U.S. PATENT DOCUMENTS 1,663,570 A * 3/1928 Senz ...................... B65D 39/08 220/297
3,372,828 A * 3/1968 Pechacek ................. F17C 1/00 220/4.16

(Continued)

FOREIGN PATENT DOCUMENTS

CN 114893723 A * 8/2022
KR 100469635 B1 * 2/2005

(Continued)

*Primary Examiner* — Jacob B Meyer
(74) *Attorney, Agent, or Firm* — Lewis Roca Rothgerber Christie LLP

(57) ABSTRACT

An emergency response containment vessel for a cylinder includes a vehicle frame and a sealing container carried by the vehicle frame. The sealing container includes a barrel body including an opening, a locking module, and a cover module. The locking module includes a fixed seat surrounding the barrel body and adjacent to the opening, a ring seat connected rotatably relative to the fixed seat between lock and unlock positions, and a driving device driving the ring seat to rotate. The ring seat includes a plurality of alternating blocks and notches and an annular groove. The cover module includes a connecting arm pivotably connected to the fixed seat and a cover connected to the connecting arm, removably covering the opening, and including a plurality of engaging portions removably received in the annular groove and respectively aligned with and misaligned with the notches when the ring seat is at the unlock and lock positions, respectively.

5 Claims, 6 Drawing Sheets

(56) References Cited

U.S. PATENT DOCUMENTS

| | | | | | |
|---|---|---|---|---|---|
| 3,401,842 | A * | 9/1968 | Morrison | B05B 7/2481 | 220/300 |
| 3,858,810 | A * | 1/1975 | Seeley | B05B 7/2408 | 220/571 |
| 4,103,806 | A * | 8/1978 | White | B65D 83/40 | 222/3 |
| 4,151,929 | A * | 5/1979 | Sapien | B05B 7/2408 | 220/373 |
| 4,366,653 | A * | 1/1983 | Lafitte | F17C 13/06 | 376/205 |
| 4,817,855 | A * | 4/1989 | Bunkoczy | B64D 37/04 | 228/171 |
| 4,842,139 | A * | 6/1989 | Krieg | F17C 13/085 | 220/582 |
| 5,664,610 | A * | 9/1997 | Nickens | B23B 41/00 | 141/330 |
| 9,259,960 | B1 * | 2/2016 | Tepsi | B44D 3/12 | |
| 2003/0038142 | A1 * | 2/2003 | Gee | B65D 43/166 | 220/4.24 |
| 2009/0260290 | A1 * | 10/2009 | McQuaid | F16J 13/20 | 49/371 |
| 2013/0101708 | A1 * | 4/2013 | Short | B65D 85/345 | 220/254.1 |
| 2015/0108135 | A1 * | 4/2015 | Hanna | B05B 7/2481 | 220/495.06 |
| 2015/0274381 | A1 * | 10/2015 | Rockwell | B65D 43/22 | 220/256.1 |
| 2016/0059619 | A1 * | 3/2016 | Tepsi | B65D 43/02 | 220/495.08 |
| 2017/0254477 | A1 * | 9/2017 | Schimenti | F17C 13/06 | |
| 2017/0305638 | A1 * | 10/2017 | Sonntag | B65D 25/2882 | |
| 2017/0372931 | A1 * | 12/2017 | Kirkland | H01L 21/673 | |
| 2018/0010724 | A1 * | 1/2018 | Kozak | F16L 55/11 | |
| 2018/0066796 | A1 * | 3/2018 | Heon | B21C 23/10 | |
| 2019/0217999 | A1 * | 7/2019 | Wood | B65D 81/3813 | |
| 2022/0135288 | A1 * | 5/2022 | Yeh | B65D 25/14 | 280/47.17 |
| 2022/0136657 | A1 * | 5/2022 | Yeh | F17C 13/12 | 137/312 |

FOREIGN PATENT DOCUMENTS

| | | | | |
|---|---|---|---|---|
| WO | WO-2015153631 | A1 * | 10/2015 | F17C 13/00 |
| WO | WO-2016094398 | A1 * | 6/2016 | H01L 21/673 |

* cited by examiner

EMERGENCY RESPONSE CONTAINMENT VESSEL FOR CYLINDER

CROSS-REFERENCE TO RELATED APPLICATION

This application claims priority of Taiwanese Patent Application No. 109137950, filed on Oct. 30, 2020.

FIELD

The disclosure relates to a cylinder treatment device, more particularly to an emergency response containment vessel (ERCV) for a cylinder.

BACKGROUND

Compressed gas cylinder are commonly used to supply gas required during the manufacturing process in high tech factories, particularly factories for manufacturing semiconductors. In a situation that the content stored in a compressed gas cylinder leaks out, the stored chemical substance may be harmful to the environment or the human body and thus an emergency treatment of the cylinder is required. A conventional emergency response containment vessel (ERCV) is provided for transporting the compressed gas cylinder to a special treatment facility, and includes a sealing container and a frame for carrying the container. The sealing container includes a barrel body for receiving the compressed gas cylinder therein, and a cover module including a cover and two C-shaped halves. The cover is pivotably and removably covering an opening of the barrel body. The C-shaped halves are operable to cooperate and contact with each other to form a ring frame for encircling the cover and the barrel body together so as to lock the cover onto the barrel body. However, moving one of the C-shaped halves away from the other to allow removal of the cover from the barrel body is a relatively long and time consuming process. Thus, it is troublesome to open and close the cover.

SUMMARY

Therefore, an object of the disclosure is to provide an emergency response containment vessel (ERCV) capable of alleviating the drawback of the conventional ERCV.

According to an aspect of the disclosure, an ERCV includes a vehicle frame and a sealing container. The vehicle frame includes a frame body and a plurality of wheels rotatably connected to the frame body. The sealing container is fixedly mounted on the frame body, is carried by the vehicle frame, and includes a barrel body, a locking module and a cover module. The barrel body extends along a central axis, defines a receiving space adapted for receiving a cylinder therein, and includes an open end. The open end defines an opening in spatial communication with the receiving space and has an outer rim. The locking module includes a fixed seat, a ring seat, and a driving device. The fixed seat is connected to the barrel body and is disposed adjacent to the open end. The ring seat is connected rotatably to the fixed seat, is rotatable relative to the fixed seat about the central axis, and includes an annular bottom wall, an annular side wall and a plurality of blocks. The annular bottom wall extends radially and outwardly from the distal edge. The annular side wall is connected and perpendicular to a periphery of the annular bottom wall and extends away from the barrel body in a direction along the central axis. The blocks project radially and inwardly from an inner surface of the side wall and are spaced apart from one another along a circumferential direction of the side wall. The annular bottom wall, the annular side wall and the blocks cooperate with one another to define an annular groove thereamong. The ring seat has a plurality of notches each between adjacent two of the blocks and in spatial communication with the annular groove. The driving device is operable to drive the ring seat to rotate. The cover module includes a connecting arm and a cover. The connecting arm is pivotably connected to the fixed seat. The cover is connected to the connecting arm, removably covers the opening, and includes a central portion and a plurality of engaging portions. The central portion removably covers the opening. The engaging portions project radially and outwardly from a periphery of the central portion, are respectively complementary in shape with the notches, and are removably received in the annular groove. The ring seat is driven by the driving device to rotate relative to the fixed seat between an unlock position, where the engaging portions are aligned respectively with the notches so as to allow the engaging portions to pass respectively through the notches so that the cover is removable from a position of covering the opening, and a lock position, where the engaging portions are misaligned with the notches and are blocked respectively by the blocks to restrict the cover at the position of covering the opening.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
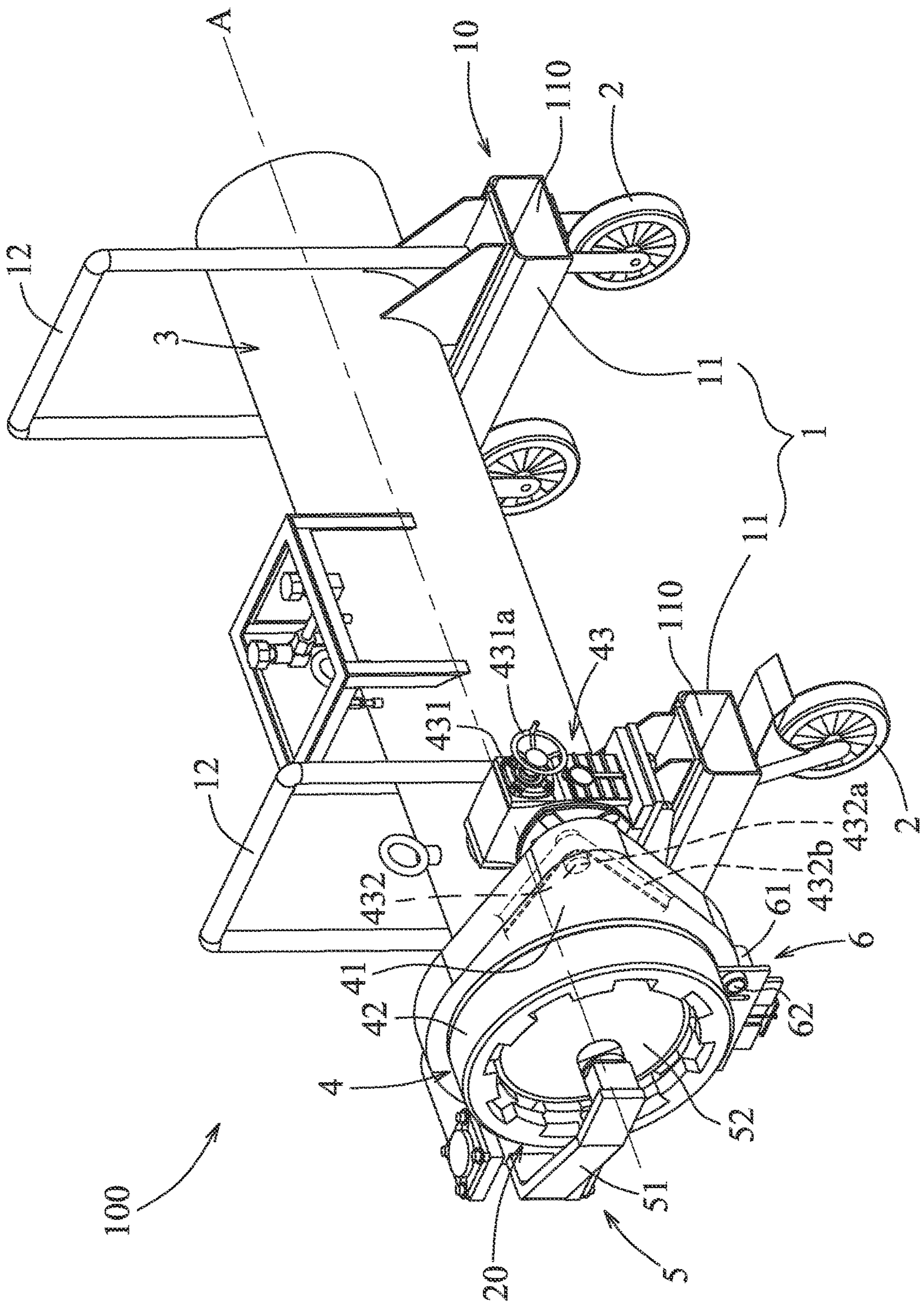
FIG. 1 is a schematic perspective view of an embodiment of an emergency response containment vessel (ERCV) according to the present disclosure.
Figure 2:
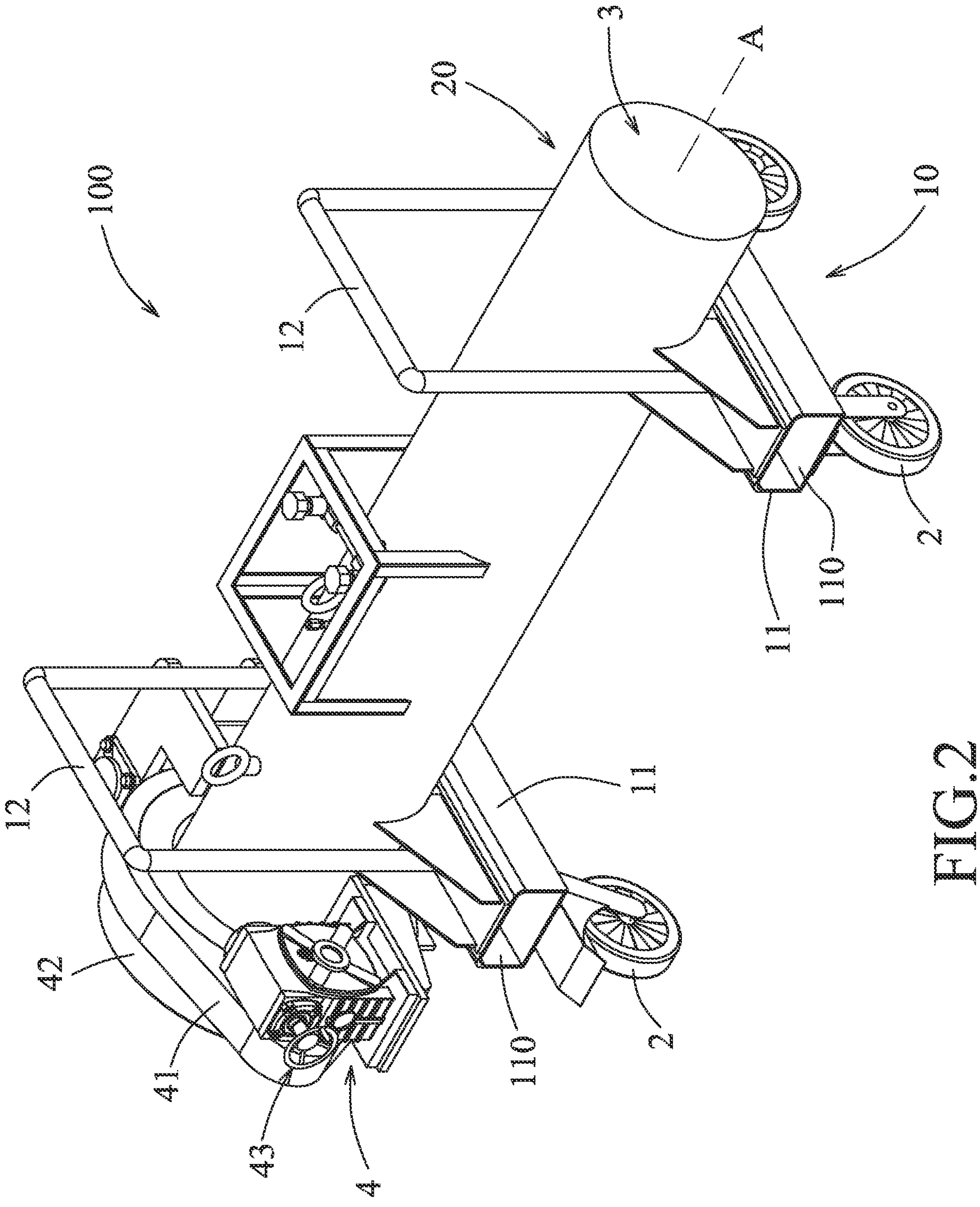
FIG. 2 is another schematic perspective view of the embodiment.
Figure 3:
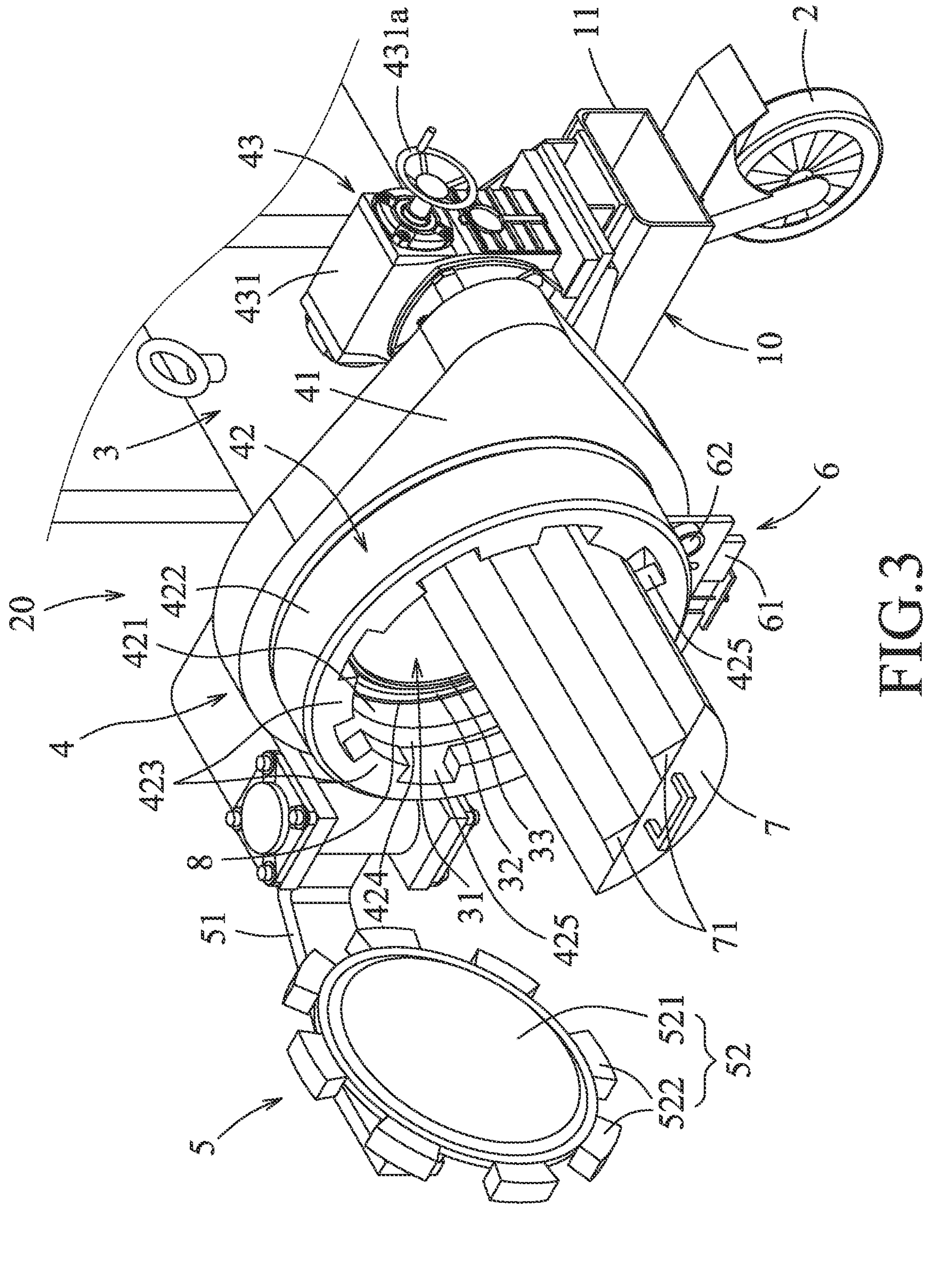
FIG. 3 is a fragmentary perspective view of the embodiment, illustrating a cover being open.

Referring to FIGS. 1 to 3, an embodiment of an emergency response containment vessel (ERCV) 100 according to the present disclosure includes a vehicle frame 10 and a sealing container 20.

The vehicle frame 10 includes a frame body 1, and a plurality of wheels 2 rotatably connected to the frame body 1. In this embodiment, the frame body 1 includes two hollow frames 11 and two handles 12. The hollow frames 11 are parallel to and spaced apart from each other, and each of the hollow frames 11 is formed with a forklift channel 110. The forklift channels 110 of the hollow frames 11 are adapted to be inserted respectively by two forks of a forklift (not shown) for transporting the ERCV 100. The handles 12 are connected respectively to the hollow frames 11. Each of the handles 12 is configured as an inverted U-shaped rod, is connected to a top surface of a respective one of the hollow frames 11 and is accessible for a user to move the vehicle frame 10. In this embodiment, the vehicle frame 10 includes four wheels 2, two of the wheels 2 are connected respectively to opposite ends of one of the hollow frames 11, and the other two of the wheels 2 are connected respectively to opposite ends of the other one of the hollow frames 11.

The sealing container 20 is fixedly mounted on the frame body 1, is carried by the vehicle frame 10, and includes a barrel body 3, a locking module 4 and a cover module 5.

The barrel body 3 is in a shape of a cylinder extending along a central axis (A), defines a receiving space 31 adapted for receiving a cylinder (not shown) therein, and includes an open end 32. The open end 32 defines an opening 33 in spatial communication with the receiving space 31, and has an outer rim 320 (see FIG. 4). The opening 33 is adapted to permit the cylinder to be disposed in or removed from the receiving space 31.

Figure 4:
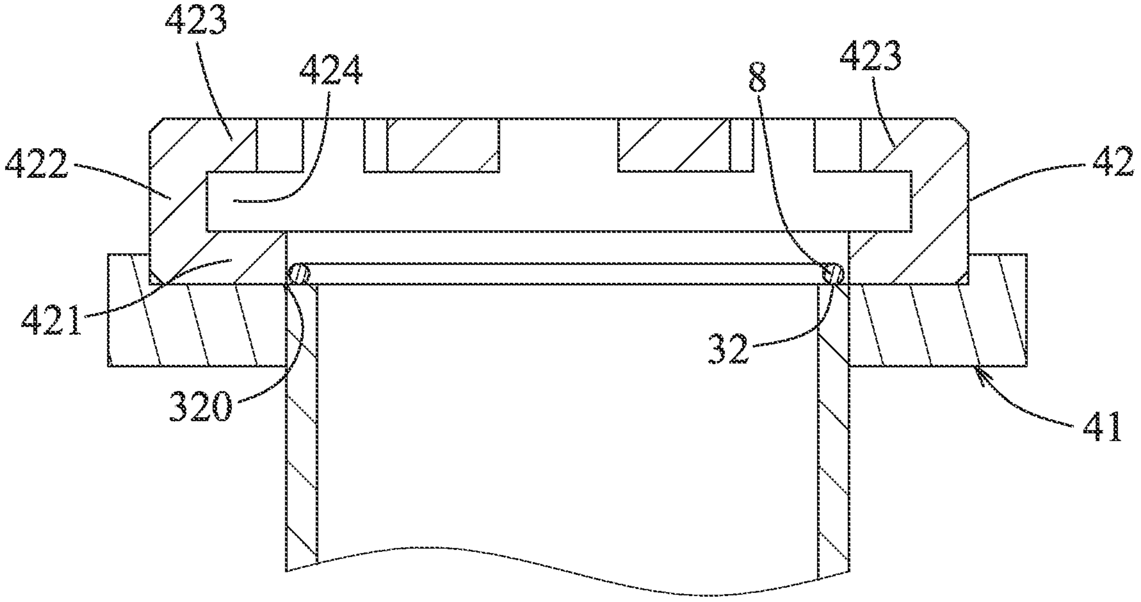
FIG. 4 is a fragmentary schematic sectional view of the embodiment, illustrating the structure of a locking module connected to a barrel body of the embodiment.

Further referring to FIG. 4, the locking module 4 includes a fixed seat 41, a ring seat 42 and a driving device 43 (see FIGS. 1-3). The fixed seat 41 is connected to the barrel body 3 and is disposed adjacent to the open end 32. The ring seat 42 is connected rotatably to the fixed seat 41, and has a portion embedded in the fixed seat 41. The ring seat is rotatable relative to the fixed seat 41 and the barrel body 3 about the central axis (A), and includes an annular bottom wall 421, an annular side wall 422 and a plurality of blocks 423. The annular bottom wall 421 extends radially and outwardly from the outer rim 320 of the open end 32. The annular side wall 422 is connected to and perpendicular to a periphery of the annular bottom wall 421, and extends away from the barrel body 3 in a direction along the central axis (A). The blocks 423 project radially and inwardly from an inner surface of the side wall 422 and are spaced apart from one another along a circumferential direction of the side wall 422. The annular bottom wall 421, the annular side wall 422 and the blocks 423 cooperate with one another to define an annular groove 424 thereamong. The ring seat 42 has a plurality of notches 425 each between adjacent two of the blocks 423 and in spatial communication with the annular groove 424.

The driving device 43 is operable to drive the ring seat 42 to rotate, and includes an operating mechanism 431 and a transmission mechanism 432. The operating mechanism 431 is mounted on the frame body 1 and is accessible for driving rotation of the ring seat 42. The transmission mechanism 432 is disposed in the fixed seat 41, is connected to the operating mechanism 431 and the ring seat 42, and is configured to transmit motion produced by the operating mechanism 431 to the ring seat 42 so as to drive rotation of the ring seat 42. In this embodiment, the operating mechanism 431 includes a handwheel 431*a*, and the transmission mechanism 432 includes pulleys 432*a* and belts 432*b* (see FIG. 1) looped on the pulleys 432*a* and the ring seat 42 (i.e., the portion embedded in the fixed seat 41) for transmitting a rotational force generated by the handwheel 431*a* to the ring seat 42. Note that in other embodiments, the transmission mechanism 432 may include a plurality of interconnected gears that are connected between the operating mechanism 431 and the ring seat 42, or sprockets and roller chains chained on the sprockets that are connected between the operating mechanism 431 and the ring seat 42 for transmitting a rotational force generated by the operating mechanism 431 to the ring seat 42. In one embodiment, the locking module 4 further includes a gear (not shown) embedded in the fixed seat 41, connected co-rotatably to the ring seat 42, and operable to be driven by the operating mechanism 431 through a roller chain meshing with the gear to rotate the ring seat 42 relative to the fixed seat 41.

The cover module 5 includes a connecting arm 51 pivotably connected to the fixed seat 41, and a cover 52 pivotably connected to the connecting arm 51. The cover 52 includes a central portion 521 and a plurality of engaging portions 522. The central portion 521 removably covers the opening 33. The engaging portions 522 project radially and outwardly from a periphery of the central portion 521, are respectively complementary in shape with the notches 425 of the ring seat 42, and are removably received in the annular groove 424 when the central portion 521 covers the opening 33.

Figure 5:
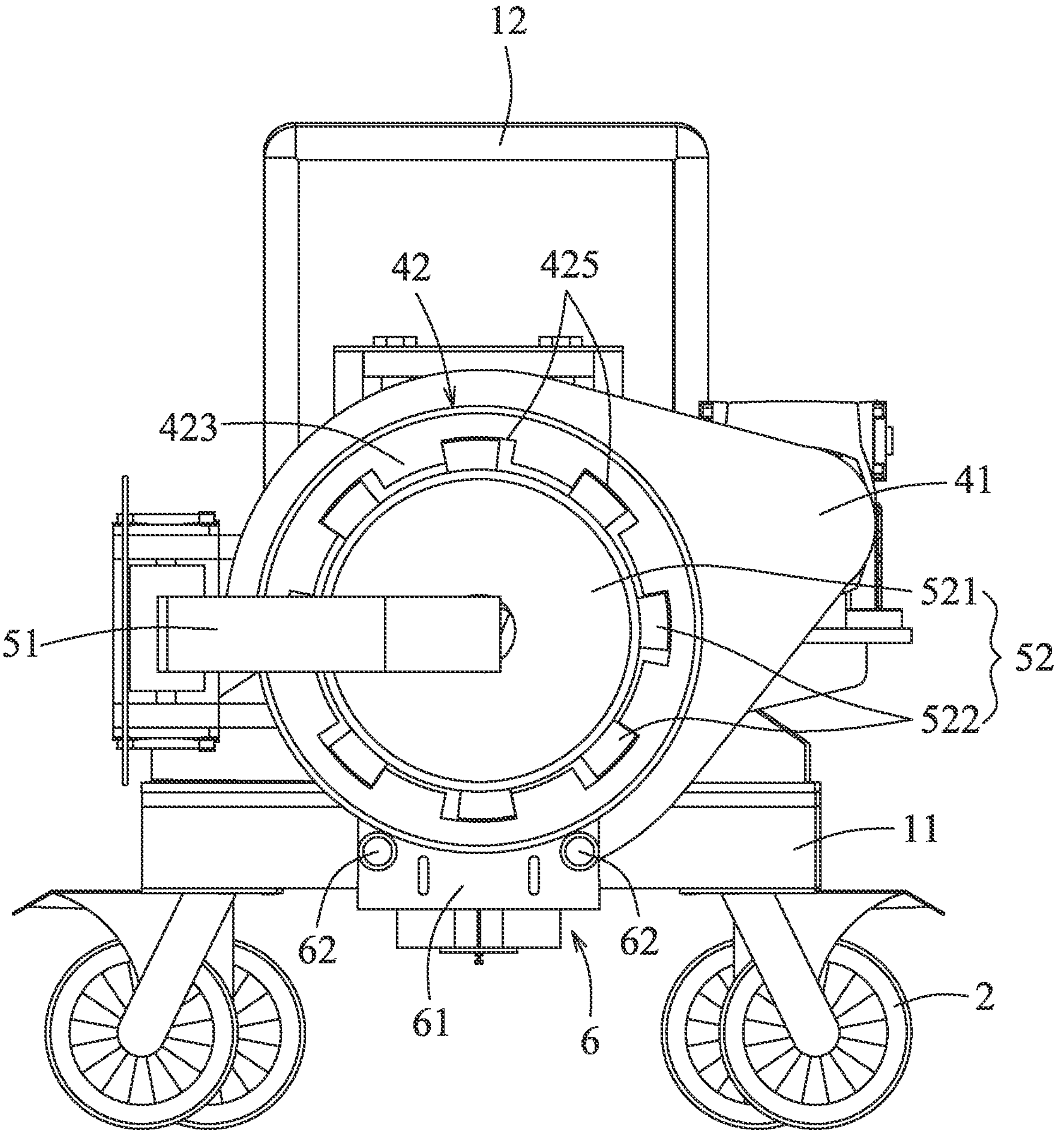
FIG. 5 is a schematic side view of the embodiment, illustrating the locking module in an unlock position.
Figure 6:
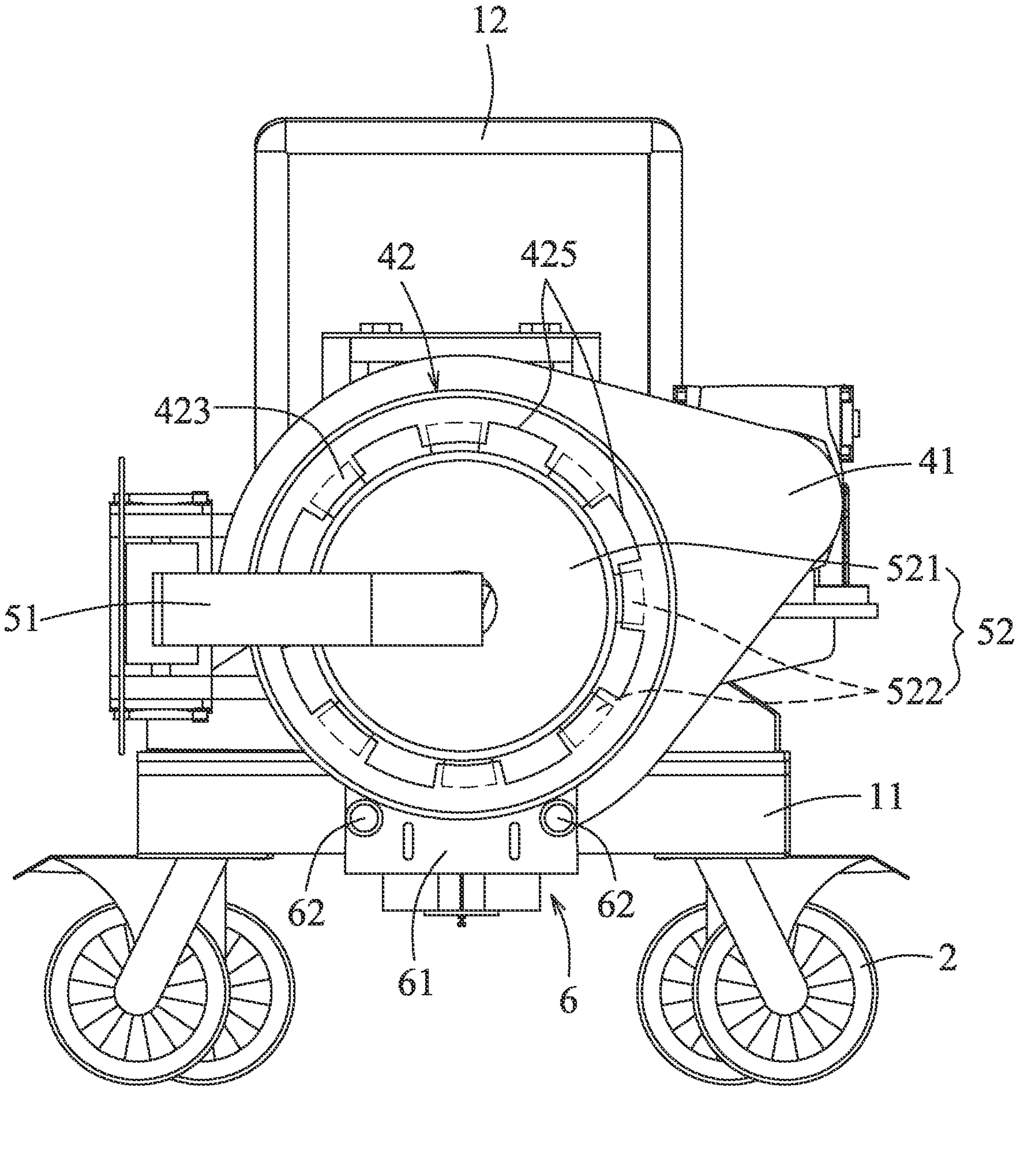
FIG. 6 is a schematic side view similar to FIG. 5, illustrating the locking module in a lock position.

Further referring to FIGS. 5 and 6, the ring seat 42 is driven by the driving device 43 to rotate relative to the fixed seat 41 between an unlock position (see FIG. 5) and a lock position (see FIG. 6). In the unlock position, the engaging portions 522 are aligned respectively with the notches 425 so as to allow the engaging portions 522 to pass respectively through the notches 425 so that the cover 52 is removable from a position of covering the opening 33. In the lock position (see FIG. 6), the engaging portions 522 are misaligned with the notches 425 and are blocked respectively by the blocks 423 to restrict the cover 52 at the position of covering the opening 33.

To cover the opening 33, the ring seat 42 is first moved to the unlock position and then the connecting arm 51 is pivoted toward the fixed seat 41 so that the cover 52 is moved to the position of covering the opening 33, such that the central portion 521 covers the opening 33 and the engaging portions 522 are received in the annular groove 424. That is to say, when the ring seat 42 is at the unlock position, the engaging portions 522 are allowed to pass respectively through the notches 425 and to be received in the annular groove 424, so that the central portion 521 can be move to the position of covering the opening 33.

Then, when the engaging portions 522 are received in the annular groove 424 and the central portion 521 covers the opening 33, the driving device 43 is operated by a user to rotate the ring seat 42 relative to the fixed seat 41 to move the ring seat to the lock position. In this way, the blocks 423 of the ring seat 42 are misaligned with the notches 523 and respectively block the engaging portions 522 to restrict the cover 52 at the position of covering the opening 33. Note that since movement of the cover 52 relative to the ring seat 42 is prevented as long as a portion of one of the engaging portions 522 is blocked by a portion of the corresponding one of the blocks 423, the ring seat 42 can be rotated relative to the fixed seat 41 by a relatively small angle to restrict the cover 52 at the position of covering the opening 33. Further, only a small turn of the ring seat 42 is required to move between the lock position and the unlock positions, and thus it is relatively easy to lock and unlock the cover 52.

In addition, in this embodiment, by virtue of the cover 52 that is pivotably connected to the connecting arm 51, the engaging portions 522 are respectively aligned with the notches 425 when passing respectively through the notches 425 while the ring seat 42 is at the unlock position.

Referring to FIGS. 1, 3, 5 and 6, the sealing container 20 further includes a bracket unit 6. The bracket unit 6 includes a seat bracket 61 that is connected to and disposed under the ring seat 42, and two rollers 62 that are mounted on the seat bracket 61 and that support the ring seat 42 to facilitate rotation of the ring seat 42. By virtue of the bracket unit 6, the ring seat 42 can be positioned relative to the cover 52 and be structurally supported against the constant pull of gravity.

Referring to FIGS. 3 and 4, the sealing container further includes a cylinder supporting frame 7 and an O-ring 8. The cylinder supporting frame 7 is removably and slidably disposed in the receiving space 31, and is adapted for supporting the cylinder thereon. To place the cylinder in the receiving space 31, the cylinder supporting frame 7 is first pulled out of the receiving space 31, and then the cylinder is disposed on the cylinder supporting frame 7. Then, the cylinder supporting frame 7 and the cylinder are pushed to slide into the receiving space 31 together. Note that the cylinder can be removed from the receiving space 31 in a manner reverse to the abovementioned operation. In this embodiment, the cylinder supporting frame 7 has two triangular prisms 71, the cylinder is disposed between the triangular prisms 71, such that rolling of the cylinder on the supporting frame 7 is prevented. Note that the cylinder supporting frame 7 can only move in the direction along the central axis (A), and cannot rotate about the central axis (A).

The O-ring 8 is disposed on the open end 32 of the barrel body 3 adjacent to the opening 33, and is clamped between the open end 32 and the cover 52 to form an air-tight seal therebetween when the cover 52 covers the opening 33, and thus, air-tightness of the barrel body 3 is enhanced. In one embodiment, the cover module 5 includes an O-ring (not shown) disposed on the central portion 521 of the cover 52. The O-ring cooperates with the O-ring 8 to further increase air-tightness of the barrel body 3 when the cover 52 covers the opening 33.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An emergency response containment vessel (ERCV) comprising:

- a vehicle frame including a frame body, and a plurality of wheels rotatably connected to said frame body; and
- a sealing container fixedly mounted on said frame body, being carried by said vehicle frame, and including
  - a barrel body extending along a central axis, defining a receiving space adapted for receiving a cylinder therein, and including an open end that defines an opening in spatial communication with said receiving space and that has an outer rim,
  - a locking module including
    - a fixed seat that is connected to said barrel body and that is disposed adjacent to said open end,
    - a ring seat that is connected rotatably to said fixed seat, that is rotatable relative to said fixed seat about the central axis, and that includes an annular bottom wall extending radially and outwardly from said outer rim, an annular side wall connected to and perpendicular to a periphery of said annular bottom wall and extending away from said barrel body in a direction along the central axis, and a plurality of blocks projecting radially and inwardly from an inner surface of said side wall and spaced apart from one another along a circumferential direction of said side wall, said annular bottom wall, said annular side wall and said blocks cooperating with one another to define an annular groove thereamong, said ring seat having a plurality of notches each between adjacent two of said blocks and in spatial communication with said annular groove, and
    - a driving device that is operable to drive said ring seat to rotate, and
  - a cover module including a connecting arm that is pivotably connected to said fixed seat, and a cover that is connected to said connecting arm, that removably covers said opening, and that includes
    - a central portion removably covering said opening, and
    - a plurality of engaging portions projecting radially and outwardly from a periphery of said central portion, being respectively complementary in shape with said notches, and removably received in said annular groove,
- wherein said ring seat is driven by said driving device to rotate relative to said fixed seat between an unlock position, where said engaging portions are aligned respectively with said notches so as to allow said engaging portions to pass respectively through said notches so that said cover is removable from a position of covering said opening, and a lock position, where said engaging portions are misaligned with said notches and are blocked respectively by said blocks to restrict said cover at the position of covering said opening.

2. The ERCV as claimed in claim 1, wherein said cover is pivotably connected to said connecting arm.

3. The ERCV as claimed in claim 1, wherein said sealing container further includes a bracket unit including a seat bracket that is connected to and disposed under said ring seat, and two rollers that are mounted on said seat bracket and that support said ring seat to facilitate rotation of said ring seat.

4. The ERCV as claimed in claim 1, wherein said driving device includes:

- an operating mechanism mounted on said frame body and accessible for driving rotation of said ring seat, and
- a transmission mechanism disposed in said fixed seat, connected to said operating mechanism and said ring seat, and configured to transmit motion produced by said operating mechanism to said ring seat so as to drive rotation of said ring seat.

5. The ERCV as claimed in claim 1, wherein said sealing container further includes a cylinder supporting frame removably and slidably disposed in said receiving space and adapted for supporting the cylinder thereon.

* * * * *